US012717400B2

(12) United States Patent
Chiu et al.

(10) Patent No.: US 12,717,400 B2
(45) Date of Patent: Aug. 25, 2026

(54) IDLE TIME PREDICTION METHOD AND IDLE TIME PREDICTION DEVICE

(71) Applicant: MEDIATEK INC., Hsin-Chu (TW)

(72) Inventors: Chih-Wei Chiu, Hsinchu City (TW); Chu-Chia Kuo, Hsinchu City (TW); Kuan-Hsian Hsieh, Hsinchu City (TW); Chih-Chieh Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 85 days.

(21) Appl. No.: 18/764,182

(22) Filed: Jul. 4, 2024

(65) Prior Publication Data

US 2025/0013286 A1 Jan. 9, 2025

Related U.S. Application Data

(60) Provisional application No. 63/512,311, filed on Jul. 7, 2023.

(51) Int. Cl.
*G06F 1/00* (2006.01)
*G06F 1/3296* (2019.01)

(52) U.S. Cl.
CPC .................................. *G06F 1/3296* (2013.01)

(58) Field of Classification Search
CPC .... G06F 1/3296; G06F 1/3206; G06F 1/3234; G06F 1/3243; G06F 1/3287; G06F 1/3203
See application file for complete search history.

(56) References Cited

U.S. PATENT DOCUMENTS

2008/0028240 A1 1/2008 Arai
2014/0006824 A1* 1/2014 Maciocco ............ G06F 1/3203 713/323
2014/0181553 A1* 6/2014 Eckert .................... G06F 1/329 713/323
2014/0181556 A1* 6/2014 Eckert .................. G06F 1/3296 713/323
2015/0039922 A1* 2/2015 Chalhoub ............ G06F 1/3296 713/323
2015/0198991 A1* 7/2015 Bircher .................. G06F 1/329 713/323
2020/0073469 A1* 3/2020 Sadowski ............ G06F 9/5094
2020/0201417 A1* 6/2020 Park ..................... G06F 1/3275
2022/0317757 A1 10/2022 Rao

FOREIGN PATENT DOCUMENTS

CN 109558295 A 4/2019
CN 114840342 A 8/2022
TW 202236141 A 9/2022
WO 01/15161 A1 3/2001

* cited by examiner

*Primary Examiner* — Xuxing Chen
(74) *Attorney, Agent, or Firm* — Winston Hsu

(57) ABSTRACT

An idle time prediction method for a system includes obtaining n idle durations corresponding to n time points, determining if the n idle durations are of a normal distribution, generating a probability according to m idle states corresponding to m idle durations of the n idle durations if the n idle durations are not normally distributed, selecting a predicted idle state according to the probability, and controlling the system to enter the predicted idle state, where n and m are integers larger than one, and m≤n.

15 Claims, 3 Drawing Sheets

IDLE TIME PREDICTION METHOD AND IDLE TIME PREDICTION DEVICE

CROSS REFERENCE TO RELATED APPLICATIONS

This application claims the benefit of U.S. Provisional Application No. 63/512,311, filed on Jul. 7, 2023. The content of the application is incorporated herein by reference.

BACKGROUND

When a system is in operation, unused units of the system can enter idle states to reduce power consumption. For example, a portion of a processor or the entire processor, may enter an idle state, or a subsystem of the system may enter an idle state for saving power.

However, it is a challenge to perform controls related to the idle states. If a unit enters an idle state which is overly deep, the idle time may be too long, and the overhead of re-awakening the unit may be excessive. If a unit enters an idle state which is too shallow, the effect of saving power may be insufficient. Hence, a solution is still in need to better control the idle states for a system.

SUMMARY

An embodiment provides an idle time prediction method used for a system. The idle time prediction method includes obtaining n idle durations corresponding to n time points, determining if the n idle durations are normally distributed, selecting a predicted idle state according to an average of the n idle durations if the n idle durations are normally distributed, and controlling the system to enter the predicted idle state, where n is an integer larger than one.

Another embodiment provides an idle time prediction method used for a system. The idle time prediction method includes obtaining n idle durations corresponding to n time points, determining if the n idle durations are of a normal distribution, generating a probability according to m idle states corresponding to m idle durations of the n idle durations if the n idle durations are not normally distributed, selecting a predicted idle state according to the probability, and controlling the system to enter the predicted idle state, where n and m are integers larger than one, and m≤n.

Another embodiment provides an idle time prediction device used for a system. The idle time prediction device includes a monitor and a processor. The monitor is coupled to the system and used to observe the system to obtain n idle durations corresponding to n time points. The processor is coupled to the monitor and used to determine if the n idle durations are normally distributed, select a predicted idle state according to an average of the n idle durations if the n idle durations are normally distributed, and control the system to enter the predicted idle state, where n is an integer larger than one.

Another embodiment provides an idle time prediction device used for a system. The idle time prediction device includes a monitor and a processor. The monitor is coupled to the system and used to observe the system to obtain n idle durations corresponding to n time points. The processor is coupled to the monitor and used to determine if the n idle durations are of a normal distribution, generate a probability according to m idle states corresponding to m idle durations of the n idle durations if the n idle durations are not normally distributed, select a predicted idle state according to the probability, and control the system to enter the predicted idle state, where n and m are integers larger than one, and m≤n.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
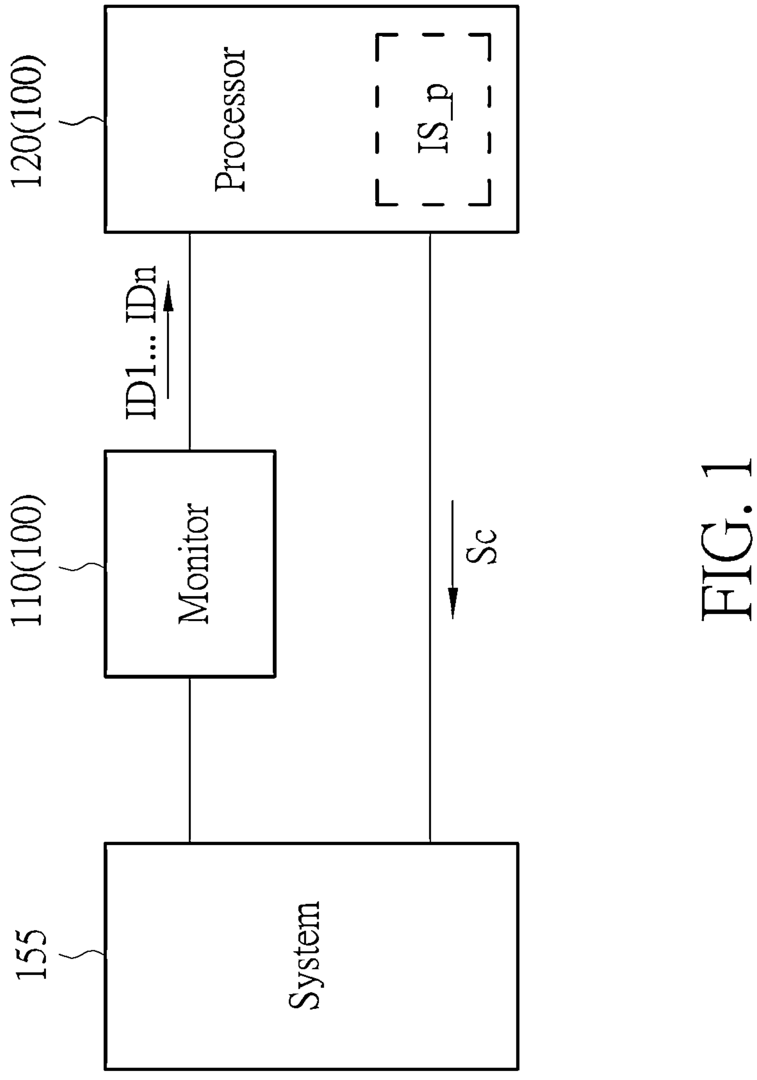
FIG. 1 illustrates an idle time prediction device for controlling a system according to an embodiment.

In the text, an asterisk (i.e. *) may be the multiplication sign. FIG. 1 illustrates an idle time prediction device 100 for controlling a system 155 according to an embodiment. The idle time prediction device 100 can include a monitor 110 and a processor 120. The monitor 110 can be coupled to the system 155 for observing the system 155 to obtain n idle durations ID1 to IDn corresponding to n time points, where n is an integer larger than one. The n idle durations ID1 to IDn can be actual idle durations obtained through measurement and observation and can be recorded in a log file.

The processor 120 can be coupled to the monitor 110 and the system 155 for determining if the n idle durations ID1 to IDn are normally distributed. If the n idle durations are normally distributed, the processor 120 can select a predicted idle state IS_p according to an average (expressed as ID_avg) of the n idle durations ID1 to IDn. Then, the processor 120 can transmit a control signal Sc to control the system 155 to enter the predicted idle state IS_p. For example, if the average ID_avg is 500 milliseconds and corresponding to a shallow idle state defined for the system 155, the predicted idle state IS_p can be the shallow idle state. In another example, if the average ID_avg is 10 seconds and corresponding to a deep idle state defined for the system 155, the predicted idle state IS_p can be the deep idle state.

In another condition, if the n idle durations are not normally distributed, the processor 120 can generate a probability (expressed as P) according to m idle states corresponding to m idle durations of the n idle durations, where n and m are integers larger than one, and m≤n. In this condition, the predicted idle state IS_p can be selected according to the probability P, and the processor 120 can transmit a control signal Sc to control the system 155 to enter the predicted idle state IS_p.

For example, the abovementioned predicted idle state IS_p can be a shallow idle state or a deep idle state, where the shallow idle state can be corresponding to a shorter idle duration, and the deep idle state can be corresponding to a longer idle duration. In another example, the abovementioned predicted idle state IS_p can be one of a plurality of idle states, where the plurality of idle states are corresponding to a plurality of different idle durations respectively.

The processor 120 can include a central processing unit (CPU), a graphic processing unit (GPU), a tensor processing unit (TPU), a neural network processing unit (NPU), an application specific integrated circuit (ASIC), a deep learning processing unit (DPU), a vector processing unit (VPU), a microprocessor, a micro controller unit (MCU) and/or an appropriate processing unit. The monitor 110 can be implemented using hardware (e.g. circuit on a printed circuit board, circuit on a field-programmable gate array and/or integrated circuit), and appropriate software and/or firmware can be installed in the monitor 110 for measuring the n idle durations ID1 to IDn. The processor 120 and the monitor 110 can be separated in different units or integrated in one unit. For example, the processor 120 and the monitor 110 can be integrated in an application specific integrated circuit (ASIC) with appropriate software and/or firmware.

Figure 2:
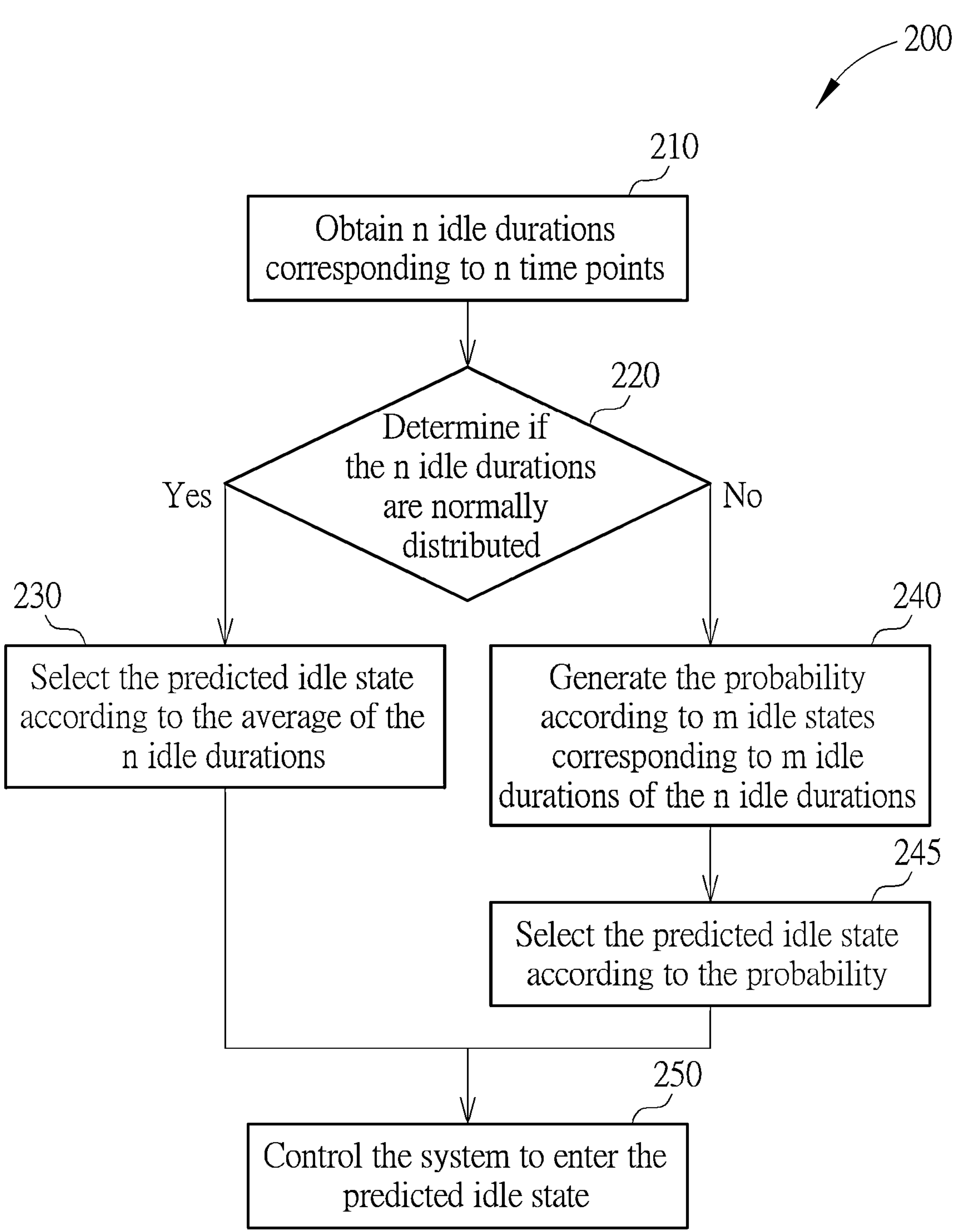
FIG. 2 is a flowchart of an idle time prediction method for the system according to an embodiment.

FIG. 2 is a flowchart of an idle time prediction method 200 for the system 155 according to an embodiment. The idle time prediction method 200 can be performed with the idle time prediction device 100 in FIG. 1. The idle time prediction method 200 can include the following steps.

Step 210: obtain n idle durations ID1 to IDn corresponding to n time points;

Step 220: determine if the n idle durations ID1 to IDn are normally distributed; if so, enter Step 230; otherwise, enter Step 240;

Step 230: select the predicted idle state IS_p according to the average ID_avg of the n idle durations ID1 to IDn; enter Step 250;

Step 240: generate the probability P according to m idle states corresponding to m idle durations of the n idle durations ID1 to IDn;

Step 245: select the predicted idle state IS_p according to the probability P; and Step 250: control the system 155 to enter the predicted idle state IS_p.

Step 210 can be performed using the monitor 110. Step 220 to Step 250 can be performed using the processor 120.

In Step 220, the n idle durations ID1 to IDn can be determined to be normally distributed if the average ID_avg of the n idle durations ID1 to IDn is larger than k times a standard deviation (expressed as $\sigma$) of the n idle durations ID1 to IDn, and k is an integer larger than one. For example, k can be six. In other words, if the average ID_avg is larger than six times the standard deviation $\sigma$ (i.e. ID_avg>6*$\sigma$), the n idle durations ID1 to IDn can be determined to be normally distributed. The standard deviation $\sigma$ can be generated with the following equation eq-1:

$$\sigma = \sqrt{\frac{1}{n}\sum_{i=1}^{n}(IDi - \text{ID\_avg})^2}; \qquad \text{eq-1}$$

In equation eq-1, the variable i can be integers from 1 to n.

According to another embodiment, in Step 220, the n idle durations ID1 to IDn can be determined to be normally distributed if the standard deviation $\sigma$ of the n idle durations ID1 to IDn is smaller than a predetermined threshold. Here, the predetermined threshold can be determined according to experiments.

In FIG. 2, the n idle durations ID1 to IDn can be classified into a plurality of idle states, and the predicted idle state IS_p can be one of the plurality of idle states. For example, the plurality of idle states can include a deep idle state corresponding to a longer idle duration and a shallow idle state corresponding to a shorter idle duration. In another example, the plurality of idle states can include a first idle state, a second idle state and a third idle state corresponding to different idle durations respectively.

In Step 240 and Step 245, n and m can be integers larger than one, and m≤n. In Step 240, the m idle durations used for generating the probability P can be consecutive in time. In Step 240, the probability P can be generated using a machine learning model according to the m idle states corresponding to the m idle durations of the n idle durations ID1 to IDn. For example, the machine learning model can include a convolutional neural network (CNN), a recurrent neural network (RNN), a deep neural network (DNN) and/or a proper neural network model.

Figure 3:
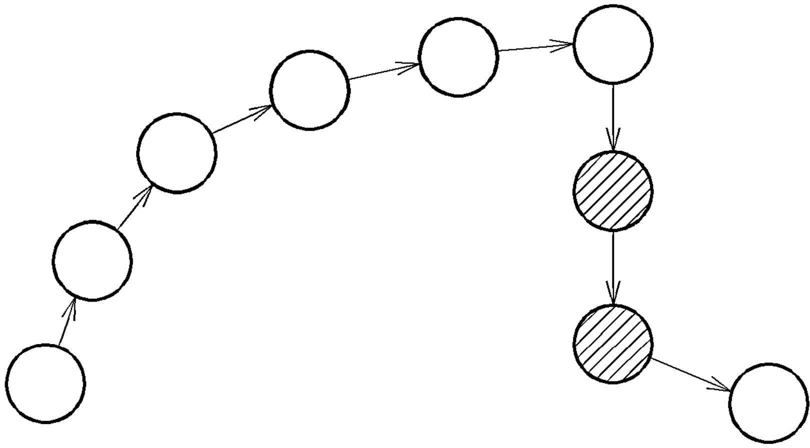
FIG. 3 illustrates a state diagram for describing the idle states of the system according to an example.

FIG. 3 illustrates a state diagram for describing the idle states of the system 155 according to an example. FIG. 3 can be corresponding to a plurality of idle states related to the n idle durations ID1 to IDn of the system 155. In FIG. 3, each "bubble" can represent an idle state, a white bubble can represent a shallow idle state, and a gray bubble can represent a deep idle state. The idle states in FIG. 3 are actual idle states recorded by observing the system 155. As shown in FIG. 3, sequentially, the first state to the sixth state of the system 155 can be shallow idle states, the seventh state and the eighth state of the system 155 can be deep idle states, and the ninth state of the system 155 can be a shallow idle state. FIG. 3 is merely an example, and more actual idle states of the system 155 can be observed in practice. For example, 31 or 62 idle states of the system 155 can be observed and recorded.

Figure 4:
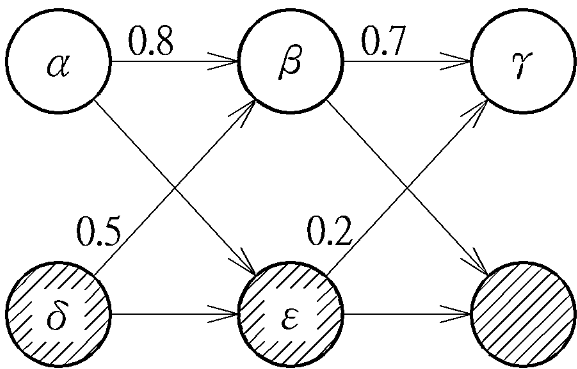
FIG. 4 illustrates a diagram for predicting the idle state of the system according to the actual idle states related to the n idle durations of the system in an example.

FIG. 4 illustrates a diagram for predicting the idle state of the system 155 according to the actual idle states related to the n idle durations ID1 to IDn of the system 155 in an example. FIG. 4 can be related to Step 240 and Step 245 in FIG. 2. As shown in FIG. 4, after the system 155 has entered a first shallow idle state (e.g. the state $\alpha$), the probability of entering a second shallow state (e.g. the state $\beta$) may be 0.8 (i.e. 80%). After the system 155 has entered two consecutive shallow idle states (e.g. the states $\alpha$ and $\beta$), the probability of entering a third shallow state (e.g. the state $\gamma$) may be 0.7 (i.e. 70%). After the system 155 has entered a first deep idle state (e.g. the state $\delta$), the probability of entering a shallow state (e.g. the state $\beta$) may be 0.5 (i.e. 50%). After the system 155 has entered two consecutive deep idle states (e.g. the states $\delta$ and ¿), the probability of entering a shallow state (e.g. the state $\gamma$) may be 0.2 (i.e. 20%). FIG. 4 is merely an example showing six idle states. In practice, the diagram of FIG. 4 can include more idle states, such as 62 idle states.

In Step 240 and Step 245 of FIG. 2, the probability P can be estimated using the machine learning model (e.g. neural network model) of the processor 120. A hidden Markov model and a hidden Markov algorithm can be used to generate the probability P (e.g. one of the probabilities mentioned in FIG. 4) according to a portion or all of the actual idle states related to the n idle durations ID1 to IDn of the system 155.

According to embodiments, the system 155 can include a processor (e.g. CPU, GPU or microcontroller), a memory (e.g. synchronous dynamic random-access memory, dynamic random-access memory, or double data-rate synchronous dynamic random-access memory), an interface and/or a bus (e.g. infra-bus).

In summary, by using the idle time prediction device 100 and the idle time prediction method 200, a proper idle state (e.g. a shallow idle state or a deep idle state) can be predicted and selected for the system 155 to enter the selected idle state. Hence, the controls for the system 155 can be more accurate. As a result, the processor 120 can better control the idle states for the system 155, and the related overhead and power consumption are effectively reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An idle time prediction method used for a system, comprising:

obtaining n idle durations corresponding to n time points;

determining if the n idle durations are normally distributed;

selecting a predicted idle state according to an average of the n idle durations if the n idle durations are normally distributed; and controlling the system to enter the predicted idle state;

wherein n is an integer larger than one; and the n idle durations are determined to be normally distributed if a standard deviation of the n idle durations is smaller than a predetermined threshold.

2. The method of claim 1, wherein the n idle durations are determined to be normally distributed if the average of the n idle durations is larger than k times the standard deviation of the n idle durations, and k is an integer larger than one.

3. The method of claim 2, wherein k is six.

4. The method of claim 1, wherein the n idle durations are classified into a plurality of idle states, and the predicted idle state is one of the plurality of idle states.

5. The method of claim 4, wherein the plurality of idle states comprise a deep idle state and a light idle state, and a first duration corresponding to the deep idle state is longer than a second duration corresponding to the light idle state.

6. An idle time prediction method used for a system, comprising:

obtaining n idle durations corresponding to n time points;

determining if the n idle durations are of a normal distribution;

generating a probability according to m idle states corresponding to m idle durations of the n idle durations if the n idle durations are not normally distributed;

selecting a predicted idle state according to the probability; and controlling the system to enter the predicted idle state;

wherein n and m are integers larger than one, and m≤n.

7. The method of claim 6, wherein the m idle durations are consecutive in time.

8. The method of claim 6, wherein the n idle durations are determined to be normally distributed if the average of the n idle durations is larger than k times a standard deviation of the n idle durations, and k is an integer larger than one.

9. The method of claim 8, wherein k is six.

10. The method of claim 6, wherein the n idle durations are determined to be normally distributed if a standard deviation of the n idle durations is smaller than a predetermined threshold.

11. The method of claim 6, wherein the n idle durations are classified into a plurality of idle states, and the predicted idle state is one of the plurality of idle states.

12. The method of claim 11, wherein the plurality of idle states comprise a deep idle state and a light idle state, and a first duration corresponding to the deep idle state is longer than a second duration corresponding to the light idle state.

13. The method of claim 6, wherein the probability is generated using a machine learning model according to the m idle states corresponding to the m idle durations of the n idle durations.

14. An idle time prediction device used for a system, comprising:

a monitor coupled to the system and configured to observe the system to obtain n idle durations corresponding to n time points, wherein the monitor is implemented as a circuit on a printed circuit board, a field-programmable gate array, or an integrated circuit; and a processor coupled to the monitor and configured to determine if the n idle durations are normally distributed, select a predicted idle state according to an average of the n idle durations if the n idle durations are normally distributed, and control the system to enter the predicted idle state;

wherein n is an integer larger than one; and the n idle durations are determined to be normally distributed if a standard deviation of the n idle durations is smaller than a predetermined threshold.

15. An idle time prediction device used for a system, comprising:

a monitor coupled to the system and configured to observe the system to obtain n idle durations corresponding to n time points, wherein the monitor is implemented as a circuit on a printed circuit board, a field-programmable gate array, or an integrated circuit; and a processor coupled to the monitor and configured to determine if the n idle durations are of a normal distribution, generate a probability according to m idle states corresponding to m idle durations of the n idle durations if the n idle durations are not normally distributed, select a predicted idle state according to the probability, and control the system to enter the predicted idle state;

wherein n and m are integers larger than one, and m≤n.

* * * * *